US012197052B2

(12) United States Patent
Kataoka et al.

(10) Patent No.: US 12,197,052 B2
(45) Date of Patent: Jan. 14, 2025

(54) OPTICAL WAVEGUIDE ELEMENT

(71) Applicant: SUMITOMO OSAKA CEMENT CO., LTD., Tokyo (JP)

(72) Inventors: Yu Kataoka, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 303 days.

(21) Appl. No.: 17/593,931

(22) PCT Filed: Sep. 27, 2019

(86) PCT No.: PCT/JP2019/038181
§ 371 (c)(1),
(2) Date: Sep. 28, 2021

(87) PCT Pub. No.: WO2020/194800
PCT Pub. Date: Oct. 1, 2020

(65) Prior Publication Data
US 2022/0163825 A1     May 26, 2022

(30) Foreign Application Priority Data
Mar. 28, 2019   (JP) ................................. 2019-064448

(51) Int. Cl.
*G02B 6/132*   (2006.01)
*G02B 6/122*   (2006.01)
*G02F 1/035*   (2006.01)

(52) U.S. Cl.
CPC ........... *G02F 1/035* (2013.01); *G02B 6/1228* (2013.01); *G02B 6/132* (2013.01); *G02F 2201/02* (2013.01); *G02F 2202/20* (2013.01)

(58) Field of Classification Search
CPC .............................. G02B 6/1228; G02B 6/132
See application file for complete search history.

(56) References Cited

U.S. PATENT DOCUMENTS

| 8,873,906 B2 * | 10/2014 | Tokushima | B29D 11/00663 |
| | | | 264/1.25 |
| 9,310,558 B2 * | 4/2016 | Huang | G02B 6/12002 |

(Continued)

FOREIGN PATENT DOCUMENTS

| JP | 04015604 A | 1/1992 |
| JP | 06289341 A | 10/1994 |

(Continued)

OTHER PUBLICATIONS

KR 100333900 B1 English translation (Year: 2002).*
ISR issued in PCT/JP2019/038181 mailed Oct. 29, 2019.

*Primary Examiner* — Charlie Y Peng
(74) *Attorney, Agent, or Firm* — GREER BURNS & CRAIN, LTD.

(57) ABSTRACT

In order to provide an optical waveguide element that is capable of reducing coupling loss at a coupling portion with an optical fiber and of reducing propagation loss in an optical waveguide, the optical waveguide element comprises a supporting substrate and a waveguide layer consisting of a material having an electro-optic effect stacked on the supporting substrate, wherein a rib portion for forming an optical waveguide is provided protruding on an upper surface of the waveguide layer; a groove portion is formed on an upper surface of the supporting substrate directly below a part of the rib portion; and the groove portion is filled with a material having an effective refractive index comparable to that of the waveguide layer.

13 Claims, 30 Drawing Sheets

(56) References Cited

U.S. PATENT DOCUMENTS

| | | | |
|---|---|---|---|
| 9,417,388 B2* | 8/2016 | Yamasaki | G02B 6/305 |
| 9,547,129 B1 | 1/2017 | Kato et al. | |
| 9,658,400 B2* | 5/2017 | Hofrichter | G02B 6/136 |
| 10,845,669 B2* | 11/2020 | Mahgerefteh | G02F 1/2257 |
| 2002/0067892 A1* | 6/2002 | Oguro | G02B 6/4212 |
| | | | 385/88 |
| 2010/0065726 A1* | 3/2010 | Zhong | C12Q 1/6874 |
| | | | 250/221 |
| 2019/0243070 A1* | 8/2019 | Drake | G02B 6/12 |

FOREIGN PATENT DOCUMENTS

| | | | |
|---|---|---|---|
| JP | 06313817 A | 11/1994 | |
| JP | 2000214341 A | 8/2000 | |
| JP | 2002350659 A | 12/2002 | |
| JP | 2005140822 A | 6/2005 | |
| JP | 2006284964 A | 10/2006 | |
| JP | 2011075917 A | 4/2011 | |

\* cited by examiner

OPTICAL WAVEGUIDE ELEMENT

FIELD OF THE INVENTION

The present invention relates to an optical waveguide element with a waveguide layer comprising a material having an electro-optic effect stacked on a supporting substrate.

BACKGROUND ART

Conventionally, in the fields of optical communication and optical measurement, an optical waveguide element in which an optical waveguide is formed on a substrate having an electro-optic effect has been used. For example, the following Patent Literature No. 1 discloses an optical element having a ribbed waveguide in which the optical waveguide portion is protruded and the rest of the substrate area is formed thin.

CITATION LIST

Patent Literature

[Patent Literature No. 1] Japanese Laid-open Patent Publication No. 2006-284964

SUMMARY OF THE INVENTION

Technical Problem

The optical waveguide element is coupled with an optical fiber that introduces a light wave to the optical waveguide element on the light wave input side, and is coupled with an optical fiber that outputs a light wave from the optical waveguide element on the light wave output side. For example, in the case of single mode, the light intensity distribution in the cross section perpendicular to the direction of propagation is an approximately perfect circle, so that the light wave propagating in the optical fiber has a beam shape with low distortion. On the other hand, the light wave propagating through the ribbed waveguide formed in the optical waveguide element has a distorted beam shape of light intensity distribution in the cross section perpendicular to the propagation direction to match the cross-sectional shape of the rib portion protruding from the upper surface of the waveguide layer.

Thus, the optical fiber and the optical waveguide element have different beam shapes with different light intensity distributions of the propagating the light wave. The problem is that such beam shape mismatch can cause large coupling losses at the coupling portion between the optical fiber and the optical waveguide element.

As described above, the light wave propagating through the ribbed waveguide has a beam shape that matches the cross-sectional shape of the rib portion. If the boundary area between the waveguide layer and the rib portion and the outside air is not sufficiently processed (so-called processing roughness), the light wave propagating through the ribbed waveguide may overlap with and scatter at the boundary area. The resulting problem is that the ribbed waveguide of the optical waveguide element might have large propagation losses.

In order to solve the above problems, the object of the present invention is to provide an optical waveguide element that is capable of reducing coupling loss at a coupling portion with an optical fiber and of reducing propagation loss in an optical waveguide.

Means to Solve the Problems

In order to solve the above problems, the optical waveguide element according to the present invention has the following technical features.

(1) In order to achieve the above object, an optical waveguide element according to the present invention comprises: a supporting substrate; and a waveguide layer consisting of a material having an electro-optic effect stacked on the supporting substrate, wherein: a rib portion for forming an optical waveguide is provided protruding on an upper surface of the waveguide layer; a groove portion is formed on an upper surface of the supporting substrate directly below a part of the rib portion; and the groove portion is filled with a material having an effective refractive index comparable to that of the material constituting the waveguide layer.

According to this configuration, the light wave propagating through the optical waveguide widens in the direction of the lower groove portion, making it possible to shape the beam shape of the light wave propagating through the optical waveguide of the optical waveguide element with less distortion. As a result, it is possible to make the beam shape of the light wave propagating through the optical waveguide of the optical waveguide element similar to that of a single mode light wave propagating in an optical fiber, for example, and reduce coupling loss at the coupling portion between the optical fiber and the optical waveguide element by suppressing beam shape mismatch.

Also, according to this configuration, it is possible to dispose a height of the light wave propagating through the optical waveguide of the optical waveguide element closer to the lower groove portion. As a result, it is possible to reduce the area where the light wave propagating in the optical waveguide of the optical waveguide element overlaps with a boundary area between the waveguide layer and the rib portion and the outside air, and it is possible to suppress scattering by the boundary area, thereby making it possible to reduce the propagation loss in the optical waveguide of the optical waveguide element.

(2) In the optical waveguide element according to (1) above, a cross-sectional area of the groove portion varies continuously along a direction of extension of the rib portion.

According to this configuration, it is possible to prevent scattering caused by discontinuous variations in the beam shape of the light wave propagating through the optical waveguide of the optical waveguide element. As a result, it is possible to reduce the propagation loss in the optical waveguide of the optical waveguide element by suppressing scattering due to discontinuous variations in the beam shape of the light wave.

(3) In the optical waveguide element according to (2) above, the cross-sectional area of the groove portion varies so that the cross-sectional area of the groove portion continuously decreases with respect to the direction of propagation of a light wave propagating through the optical waveguide.

According to this configuration, it is possible to vary the beam shape of the light wave propagating through the optical waveguide at the groove portion so that it gradually approaches the beam shape of the light wave propagating through the normal ribbed waveguide without the groove portion formed therein. As a result, it is possible to reduce the propagation loss in the optical waveguide of the optical waveguide element by suppressing scattering due to discontinuous variations in the beam shape of the light wave. Furthermore, it is possible to convert smoothly and with low loss from the optical waveguide in the groove portion to a normal ribbed waveguide without the groove portion formed therein.

(4) In the optical waveguide element according to (2) above, the cross-sectional area of the groove portion varies so that the cross-sectional area of the groove portion continuously increases with respect to the direction of propagation of a light wave propagating through the optical waveguide.

According to this configuration, it is possible to vary the beam shape of the light wave propagating in the normal ribbed optical waveguide without the groove portion formed therein so that it gradually approaches the beam shape of the light wave propagating in the optical waveguide at the groove portion. As a result, it is possible to reduce the propagation loss in the optical waveguide of the optical waveguide element by suppressing scattering due to discontinuous variations in the beam shape of the light wave. Furthermore, it is possible to convert smoothly and with low loss from a normal ribbed waveguide without the groove portion formed therein to the optical waveguide in the groove portion.

(5) In the optical waveguide element according to (3) or (4) above, a dimension in the width direction of the groove portion varies continuously with respect to the direction of propagation of the light wave propagating through the optical waveguide.

According to this configuration, it is possible to continuously vary the cross-sectional area of the groove portion by appropriately designing the dimension in the width direction of the groove portion. As a result, it is possible to reduce the propagation loss in the optical waveguide of the optical waveguide element by suppressing scattering due to discontinuous variations in the beam shape of the light wave.

(6) In the optical waveguide element according to (3) or (4) above, a dimension in the height direction of the groove portion varies continuously with respect to the direction of propagation of the light wave propagating through the optical waveguide.

According to this configuration, it is possible to continuously vary the cross-sectional area of the groove portion by appropriately designing the dimension in the height direction of the groove portion. As a result, it is possible to reduce the propagation loss in the optical waveguide of the optical waveguide element by suppressing scattering due to discontinuous variations in the beam shape of the light wave.

(7) In the optical waveguide element according to any one of (1) to (6) above, at a coupling portion with an input side optical fiber that introduces the light wave into the optical waveguide, and at a coupling portion with an output side optical fiber that outputs the light wave from the optical waveguide, a dimension in the width direction of the groove portion is almost the same as a dimension in the width direction of the rib portion; and a dimension in the height direction from a top surface of the rib portion to a bottom surface of the groove portion is almost the same as the dimension in the width direction of the rib portion.

According to this configuration, it is possible to make the beam shape of the light wave propagating through the optical waveguide of the optical waveguide element an approximately perfect circle at the coupling portion with the input side optical fiber and the coupling portion with the output side optical fiber. As a result, the coupling loss at the coupling portion between the optical fiber and the optical waveguide element can be reduced by reducing the mismatch of the beam shapes of the light waves at the coupling portion between the optical fiber and the optical waveguide element.

(8) In the optical waveguide element according to (7) above, having a modulation unit for modulating a light wave propagating through the optical waveguide, wherein: a cross-sectional area of the groove portion varies continuously so that the cross-sectional area of the groove portion is continuously reduced in a portion of the optical waveguide from the coupling portion with the input side optical fiber to the modulation unit; and the cross-sectional area of the groove portion varies continuously so that the cross-sectional area of the groove portion is increased in the optical waveguide from the modulation unit to the coupling portion with the output side optical fiber.

According to this configuration, it is possible to reduce the coupling loss at the coupling portion between each of the input side optical fiber and the output side optical fiber and the optical waveguide element, and it is possible to reduce the propagation loss in the optical waveguide from the coupling portion with the input side optical fiber to the modulation unit, and in the optical waveguide from the modulation unit to the coupling portion with the output side optical fiber. Furthermore, it is possible to select a structure with a higher modulation efficiency of the light wave in the modulation unit, which makes it possible to efficiently modulate the light wave in the modulation unit.

(9) In the optical waveguide element according to any one of (1) to (8) above, a dimension in a height direction of the rib portion is greater than half and less than twice of a dimension in a height direction of the groove portion.

According to this configuration, it is possible to properly define the dimensions of the rib portion and groove portion to properly confine the single mode light wave to the optical waveguide of the optical waveguide element.

(10) In the optical waveguide element according to any one of (1) to (9) above, a dimension in a width direction of the rib portion is greater than half and less than twice of a dimension in the height direction from a top surface of the rib portion to a bottom surface of the groove portion.

According to this configuration, it is possible to properly define the dimensions of the rib portion and groove portion to properly confine the single mode light wave to the optical waveguide of the optical waveguide element.

(11) In the optical waveguide element according to any one of (1) to (10) above, the material constituting the waveguide layer is lithium niobate, and the material occupying the groove portion is either lithium niobate, silicon nitride having an effective refractive index about the same as that of lithium niobate, or a resin adjusted to an effective refractive index about the same as that of lithium niobate.

According to this configuration, the material of the waveguide layer and the material occupying the groove portion can be appropriately determined to reduce the coupling loss at the coupling portion between the optical fiber and the optical waveguide element, as well as the propagation loss in the optical waveguide of the optical waveguide element.

(12) In the optical waveguide element according to any one of (1) to (11) above, the waveguide layer is bonded to the supporting substrate.

According to this configuration, it is possible to select the material to be filled in the groove portion 5 as appropriate and to manufacture the optical waveguide element in a simple process.

Effect of the Invention

According to the present invention, in the optical waveguide element, it is possible to reduce the coupling loss at the coupling portion with the optical fiber, and thus to reduce the propagation loss in the optical waveguide.

DETAILED DESCRIPTION OF THE INVENTION

Hereinafter, the embodiment for implementing the present invention is explained with reference to the drawings.

First Embodiment

An optical waveguide element in the first embodiment of the present invention will be explained.

Figure 1:
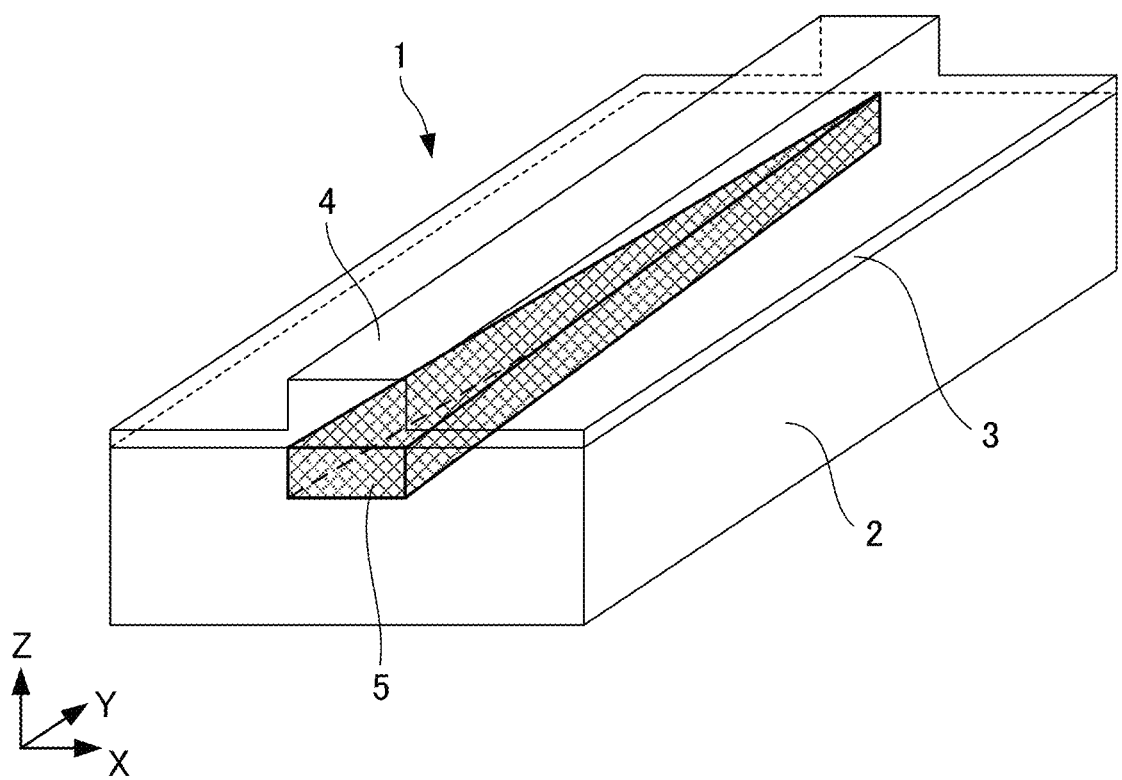
FIG. 1 is a schematic perspective view of a structure in the vicinity of the optical waveguide of an optical waveguide element in a first embodiment of the present invention.

FIG. 1 is a perspective view of a structure in the vicinity of the optical waveguide of an optical waveguide element 1 in a first embodiment of the present invention. In the drawings, the width direction of the optical waveguide element 1 is defined as X axis, the longitudinal direction of the optical waveguide element 1 is defined as Y axis, and the height direction of the optical waveguide element 1 is defined as Z axis.

The optical waveguide element 1 shown in FIG. 1 has a support substrate 2 and a waveguide layer 3 stacked on top of the support substrate 2.

The supporting substrate 2 is a substrate that compensates for the strength of the waveguide layer 3 and allows for stable support of the waveguide layer 3. The dimension of the supporting substrate 2 in the height direction is not particularly limited, but is, for example, several hundred µm. The material of the supporting substrate 2 is not particularly limited, but is, for example, a ceramic such as quartz glass.

The waveguide layer 3 is formed by a material having an electro-optic effect and is a thin sheet laminated on top of the supporting substrate 2. For example, lithium niobate (LiNbO$_3$; hereinafter referred to as LN) can be used in the waveguide layer 3 as a material having an electro-optic effect, but lithium tantalate, lead lanthanum zirconate titanate (PLZT), semiconductors, and the like may also be used. The material to be filled in the waveguide layer 3 preferably has a transmittance that is sufficient to avoid propagation loss, and a material having a high transmittance at the wavelength of the light wave propagating through the optical waveguide is preferably selected, in particular.

On the upper surface of the waveguide layer 3, a rib portion 4 made of the same material as the waveguide layer 3 is provided. The rib portion 4 is provided protruding from the upper surface of the waveguide layer 3 and is formed to have a convex cross-sectional shape. The rib portion 4 is used as an optical waveguide because of its ability to confine the light wave. The direction of extension of the optical waveguide coincides with the direction of extension of the rib portion 4 (in the Y-axis direction of FIG. 1).

The direction of propagation of the light wave propagating through the optical waveguide may be in the positive or negative direction of the Y axis. For example, in the perspective view of FIG. 1, the light wave may propagate through the optical waveguide formed by the rib portion 4 from the front side of the drawing to the back side, or conversely, through the optical waveguide formed by the rib portion 4 from the back side of the drawing to the front side. As will be described below, for example, in the optical waveguide element 1 incorporated in the optical modulator 10A shown in FIG. 6, the light wave propagates in the positive direction of the Y-axis shown in FIG. 1 in section S1, and the light wave propagates in the negative direction of the Y-axis shown in FIG. 1 in section S2.

In the present specification, a rib portion 4, which protrudes perpendicularly with respect to the upper surface of the waveguide layer 3 and has a rectangular cross-sectional shape, is shown as an example. However, the rib portion 4 is not limited to this structure, and for example, the rib portion 4 may be provided with a trapezoidal cross-sectional shape.

A groove portion 5 is provided on the upper surface of the supporting substrate 2, which is located directly below the rib portion 4. The groove portion 5 is defined by an excavated surface formed by an excavated upper surface of the support substrate 2, which is formed in a concave cross section. In FIG. 1, the supporting substrate 2, the waveguide layer 3 and the rib portion 4 are represented only as contours and transparent in order to represent the shape of the groove portion 5 in the drawing, and the material filled in the groove portion 5 is shown in shading.

The cross-sectional area of the groove defined by the groove portion 5 is set so that the cross-sectional area of the groove varies continuously along the direction of extension of the rib portion 4, which is the direction of extension of the optical waveguide. "Varies continuously" means that there are no discontinuously varying positions and the variation is smooth and connected, e.g., a gradual variation at a constant rate of variation.

In a first embodiment of the present invention, the cross-sectional area of the groove is set so that the cross-sectional area of the groove varies continuously along the direction of extension of the rib portion 4 by continuously varying the dimension in the width direction of the groove portion 5, while the dimension of the groove portion 5 in the height direction remains constant. On the front side of the perspective view of FIG. 1, the dimension in the width direction of the groove portion 5 is set to be large, and toward the back of the drawing, the dimension in the width direction of the groove portion 5 gradually decreases, and on the farthest side of the drawing, the dimension in the width direction of the groove portion 5 is set to be zero. "The dimension in the width direction of the groove portion 5 is set to be zero" means that the groove portion 5 is not formed or the groove portion 5 has disappeared.

In the present specification, the groove portion 5, which is excavated perpendicularly to the upper surface of the supporting substrate 2 and has a rectangular cross-sectional shape, is shown as an example. However, the groove portion 5 is not limited to this structure, and for example, the groove portion 5 may be provided with a trapezoidal shape in cross section. The groove portion 5 may be formed to match the shape of the rib portion 4, such as by reversing the shape of the rib portion 4 upside down.

The groove portion 5 is preferably filled with a material having an effective refractive index comparable to that of the waveguide layer 3. That is, if the refractive index of the material of the waveguide layer 3 is $n_1$ and the refractive index of the material to be filled in the groove portion 5 is $n_2$, it is preferable that $n_1 \approx n_2$. The material having the effective refractive index comparable to that of the waveguide layer 3 may be the same material as the material constituting the waveguide layer 3, such as LN, for example, or it may be silicon nitride (SiN) or resin. If the refractive index of the outside air above the rib portion 4 is $n_0$ and the refractive index of the material of the supporting substrate 2 is $n_3$, it is preferable that $n_0 < n_1$ and $n_3 < n_1$.

Figure 2:
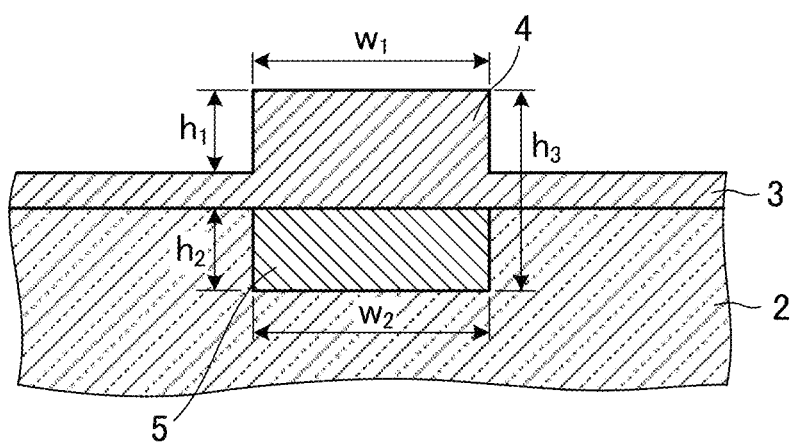
FIG. 2 is a schematic cross-sectional view to explain the dimensions of each part of the optical waveguide element in the first embodiment of the present invention.

FIG. 2 is a schematic cross-sectional view to explain the dimensions of each part of the optical waveguide element 1 in the first embodiment of the present invention. The dimension (height $h_1$) in the height direction of the rib portion 4 is set to 2 µm or less, for example. The dimension (depth $h_2$) in the height direction of the groove portion 5 is set to be approximately the same as the dimension (height $h_1$) in the height direction of the rib portion 4, for example. The dimension (width $w_1$) in the width direction of the rib portion 4 is set, for example, to 4 µm or less. The dimension (height $h_3$) in the height direction from the top surface of the rib portion 4 to the bottom surface of the groove portion 5 is set to be approximately the same as the dimension (width $w_1$) in the width direction of the rib portion 4, for example.

The dimension (width $w_2$) in the width direction of the groove portion 5 is set to a different value depending on the direction of extension of the rib portion 4. If the dimension (width $w_2$) in the width direction of the groove portion 5 is zero, the groove portion 5 is not formed. In the coupling portion with the optical fiber, as described below, the dimension (width $w_2$) in the width direction of the groove portion 5 is set so that the dimension (width $w_2$) in the width direction of the groove portion 5 is approximately the same as the dimension (width $w_1$) in the width direction of the rib portion 4, for example.

The dimension (height $h_1$) in the height direction of the rib portion 4 is preferably set to be greater than half and less than twice of the dimension (depth $h_2$) in the height direction of the groove section 5. In other words, $h_2/2 < h_1 < 2 \times h_2$ is preferred. The dimension (width $w_1$) in the width direction of the rib portion 4 is preferably set to be greater than half and less than twice of the dimension (height $h_3$) in the height direction from the top surface of the rib section 4 to the bottom surface of the groove section 5. In other words, $h_3/2 < w_1 < 2 \times h_3$ is preferred. By appropriately defining the dimensions of the rib portion 4 and the groove portion 5, it is possible to appropriately confine the single mode light wave to the optical waveguide of the optical waveguide element 1.

Figure 3A:
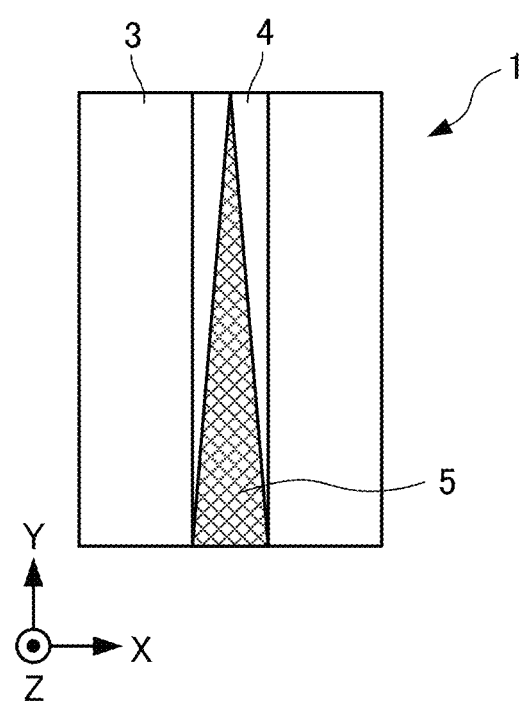
FIG. 3A is a plan view of the structure in the vicinity of the optical waveguide of the optical waveguide element shown in FIG. 1.
Figure 3B:
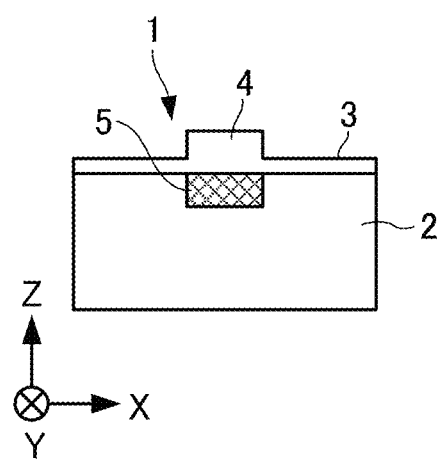
FIG. 3B is a front view of the structure in the vicinity of the optical waveguide of the optical waveguide element shown in FIG. 1.
Figure 3C:
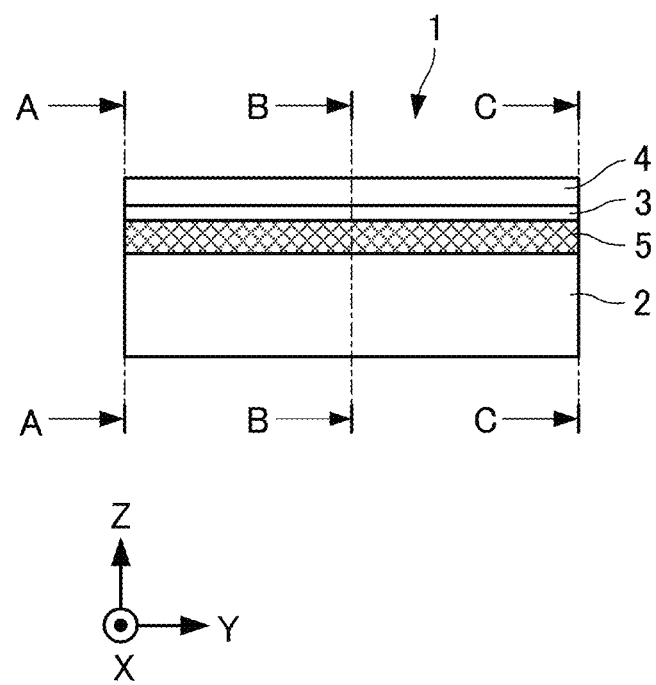
FIG. 3C is a side view of the structure in the vicinity of the optical waveguide of the optical waveguide element shown in FIG. 1.

FIG. 3A to FIG. 3C are three-plane drawings of the structure in the vicinity of the optical waveguide of the optical waveguide element 1 shown in FIG. 1. FIG. 3A is a plan view of the structure in the vicinity of the optical waveguide of the optical waveguide element 1 shown in FIG. 1. FIG. 3B is a front view of the structure in the vicinity of the optical waveguide of the optical waveguide element 1 shown in FIG. 1. FIG. 3C is a side view of the structure in the vicinity of the optical waveguide of the optical waveguide element 1 shown in FIG. 1. In FIG. 3A to FIG. 3C, as in FIG. 1, the supporting substrate 2, the waveguide layer 3 and the rib portion 4 are represented only as contours and transparent in order to represent the shape of the groove portion 5 in the drawings, and the material filled in the groove portion 5 is shown in shading.

The continuous variation of the dimension in the width direction of the groove portion 5 along the direction of extension of the rib portion 4 is clearly shown in particular in the plan view of FIG. 3A. The dimension in the width direction of the groove portion 5 is set to gradually decrease along the Y-axis direction of FIG. 3A, and the groove portion 5 has a tapered shape that tapers along the Y-axis direction in the plan view of FIG. 3A. The length of the groove portion 5 in the Y-axis direction (the longitudinal dimension of the tapered shape) is preferably long enough not to cause propagation loss due to rapid variations in the beam shape, for example, to be set at 500 μm or more.

Further, referring to the cross-sectional views shown in FIG. 4A to FIG. 4C, the fact that the groove portion 5 has a tapered shape along the direction of extension of the rib portion 4 will be described.

Figure 4A:
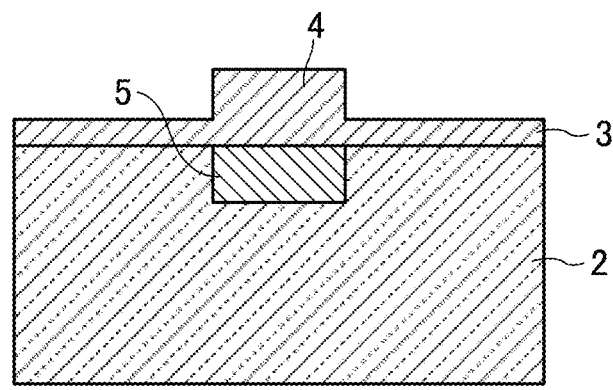
FIG. 4A is a cross-sectional structure in the vicinity of the optical waveguide of the optical waveguide element in the first embodiment of the present invention, and it is the A-A cross-sectional view of FIG. 3C.

FIG. 4A is an A-A cross-sectional view in the side view of FIG. 3C and shows the cross-sectional structure of the front side in the perspective view of FIG. 1. In the A-A cross-sectional view of FIG. 4A, the dimension (height $h_3$ in FIG. 2) in the height direction from the top surface of the rib portion 4 to the bottom surface of the groove portion 5 is approximately the same as the dimension (width $w_1$ in FIG. 2) in the width direction of the rib portion 4. The dimension (depth $h_2$ in FIG. 2) in the height direction of the groove portion 5 is approximately the same as the dimension (height $h_1$ in FIG. 2) in the height direction of the rib portion 4, and the dimension (width $w_2$ in FIG. 2) in the width direction of the groove portion 5 is approximately the same as the dimension (width $w_1$ in FIG. 2) in the width direction of the rib portion 4. That is, the cross-sectional shape of the rib portion 4 protruding from the waveguide layer 3 and the cross-sectional shape of the groove portion 5 excavated in the supporting substrate 2 are symmetrical with respect to the waveguide layer 3.

Figure 4B:
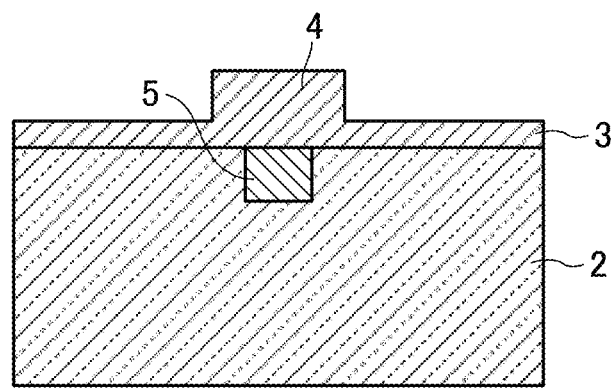
FIG. 4B shows a cross-sectional structure in the vicinity of the optical waveguide of an optical waveguide element in the first embodiment of the present invention, and it is the B-B cross-sectional view of FIG. 3C.

FIG. 4B is a B-B cross-sectional view in the side view of FIG. 3C and shows the cross-sectional structure of an approximately center section in the perspective view of FIG. 1. In the perspective view of FIG. 1, the dimension in the width direction of the groove portion 5 continuously decreases as it proceeds along the Y-axis direction from the front side to the back side. And in the cross-sectional structure of the approximately center section shown in the B-B cross-sectional view of FIG. 4B, the dimension (width $w_2$ of FIG. 2) in the width direction of the groove portion 5 is about half of the dimension (width $w_1$ of FIG. 2) in the width direction of the rib portion 4.

Figure 4C:
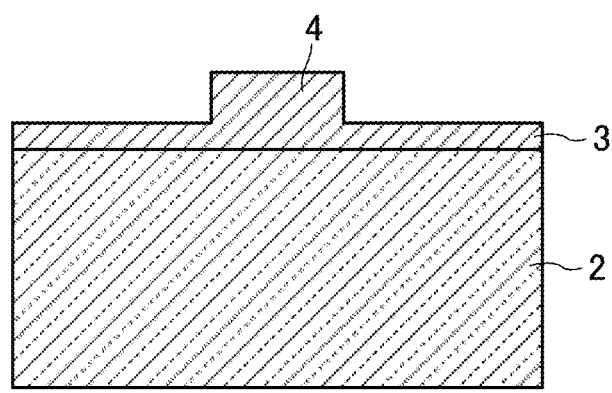
FIG. 4C shows a cross-sectional structure in the vicinity of the optical waveguide of an optical waveguide element in the first embodiment of the present invention, which is the C-C cross-sectional view of FIG. 3C.

FIG. 4C is a C-C cross-sectional view in the side view of FIG. 3C and shows the cross-sectional structure at the farthest end in the perspective view of FIG. 1. The dimension in the width direction of the groove portion 5 continuously decreases as it proceeds along the Y-axis direction, and in the farthest cross-sectional structure shown in the C-C cross-sectional view of FIG. 4C, the dimension (width w2 in FIG. 2) in the width direction of the groove portion 5 is zero, and the groove portion 5 has disappeared. The cross-sectional structure shown in the C-C cross-sectional view of FIG. 4C is identical to the cross-sectional structure of a normal ribbed waveguide.

Figure 5A:
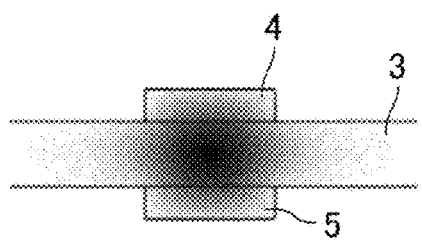
FIG. 5A shows a result of field intensity simulation of the optical waveguide element in the first embodiment of the present invention, showing the light intensity distribution in the cross-sectional structure of FIG. 4A.
Figure 5B:
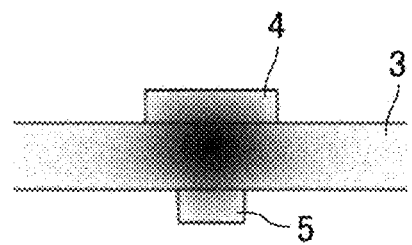
FIG. 5B shows a result of field intensity simulation of an optical waveguide element in the first embodiment of the present invention, showing the light intensity distribution in the cross-sectional structure of FIG. 4B.
Figure 5C:
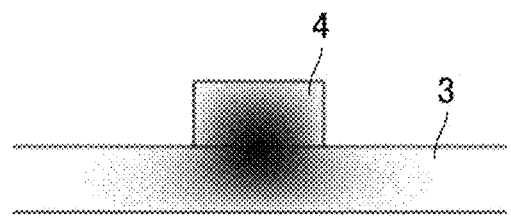
FIG. 5C shows a result of field intensity simulation of an optical waveguide element in the first embodiment of the present invention, showing the light intensity distribution in the cross-sectional structure of FIG. 4C.

FIG. 5A to FIG. 5C show results of a field intensity simulation of the optical waveguide element 1 in the first embodiment of the present invention. FIG. 5A shows the light intensity distribution in the cross-sectional structure of FIG. 4A. FIG. 5B shows the light intensity distribution in the cross-sectional structure of FIG. 4B. FIG. 5C shows the light intensity distribution in the cross-sectional structure of FIG. 4C. In FIG. 5A to FIG. 5C, the light intensity distribution is represented by shading, where higher concentration indicates higher light intensity, and lower concentration indicates weaker light intensity.

In the present specification, the direction in which the entire light wave travels through the transmission medium is referred to as the propagation direction, and the shape represented by the light intensity distribution in a cross section perpendicular to the propagation direction of the light wave is referred to herein as the beam shape. Beam shape includes geometric shape as well as size of the shape. For example, the matching of the beam shapes of two light waves means that the geometric shape and size of the light intensity distribution of one light wave and the geometric shape and size of the light intensity distribution of the other light wave match.

In the cross-sectional structure shown in FIG. 4A, the dimensions in the height direction from the top surface of the rib portion 4 to the bottom surface of the groove portion 5 and the width direction of the rib portion 4 are approximately the same. Furthermore, the dimension in the width direction of the rib portion 4 and the dimension in the width direction of the groove portion 5 are approximately the same. That is, the area surrounded by the sides of the rib portion 4 and the sides of the groove portion 5 is approximately a square with an aspect ratio of 1:1. This makes the beam shape of the light wave propagating in the optical waveguide an approximately perfect circle, similar to that of the light wave propagating in the optical fiber, as shown in FIG. 5A.

The cross-sectional structure shown in FIG. 4B has smaller dimensions in the width direction of the groove portion 5 compared to FIG. 4A. As a result, the light wave propagating through the optical waveguide has less area to spread in the groove portion 5 and more area to spread in the rib portion 4. The beam shape of the light wave is slightly distorted, as shown in FIG. 5B.

The cross-sectional structure shown in FIG. 4C has the same shape as a normal ribbed waveguide with the groove portion 5 disappearing. Therefore, the beam shape of the light wave is distorted so that it enters the rib portion 4, as shown in FIG. 5C.

When the light wave propagates in the positive direction of the Y-axis in FIG. 1, the beam shape of the light wave is gradually distorted (as shown in FIG. 5B) from a shape close to an approximately perfect circle (as shown in FIG. 5A) and varies continuously to a beam shape that is identical to that of a ribbed waveguide (as shown in FIG. 5C). Since the width dimension of the groove portion 5 varies continuously, the beam shape shown in FIG. 5A to FIG. 5C also varies continuously.

In the first embodiment of the present invention, by providing the groove portion 5 such that the dimensions in the width direction of the groove portion 5 are continuously reduced with respect to the direction of propagation of the light wave, it is possible to continuously vary the beam shape of the light wave from the beam shape of the light wave propagating in the optical fiber (a shape close to an approximately perfect circle) to the beam shape of the light wave propagating in a normal ribbed waveguide. Since the beam shape of the light wave is continuously changing, it is possible to prevent the loss caused by discontinuous and rapid variations of the beam shape of the light wave.

Furthermore, by providing a groove portion 5 formed such that the beam shape of the light wave is close to an approximately perfect circle (as shown in FIG. 5A) at the coupling portion with the optical fiber that introduces the light wave into the optical waveguide element 1, it is possible to suppress the mismatch in the beam shape between the light wave introduced from the optical fiber and the light wave introduced from the optical fiber and propagating through the optical waveguide of the optical waveguide element 1. As a result, it is possible to reduce the coupling loss at the coupling portion between the optical fiber and the optical waveguide element 1.

Conversely, when the light wave propagates in the negative direction of the Y axis of FIG. 1, the beam shape of the light wave gradually varies from the same beam shape as the ribbed waveguide (as shown in FIG. 5C) to a less distorted shape (as shown in FIG. 5B), and varies continuously to a beam shape close to an approximately perfect circle (as shown in FIG. 5A). Since the dimension in the width direction of the groove portion 5 varies continuously, the beam shape shown in FIG. 5A to FIG. 5C also varies continuously.

In the first embodiment of the present invention, by providing the groove portion 5 such that the dimension in the width direction of the groove portion 5 is continuously increased with respect to the direction of propagation of the light wave, it is possible to continuously vary the beam shape of the light wave from the beam shape of the light wave propagating in a normal ribbed waveguide to the beam shape of the light wave propagating in the optical fiber (a shape close to an approximately perfect circle). Since the beam shape of the light wave is continuously changing, it is possible to prevent the loss caused by discontinuous and rapid variations of the beam shape of the light wave.

Furthermore, by providing a groove portion 5 formed such that the beam shape of the light wave is close to an approximately perfect circle (as shown in FIG. 5A) at the coupling portion with the optical fiber that outputs the light wave from the optical waveguide element 1, it is possible to suppress the mismatch in the beam shape between the light wave introduced from the optical fiber and propagating in the optical waveguide of the optical waveguide element 1 and the light wave outputted from the optical fiber. As a result, it is possible to reduce the coupling loss at the coupling portion between the optical fiber and the optical waveguide element 1.

In addition, when the groove portion 5 is provided, the light wave spreads out to enter the groove portion 5 so that the position of the light wave (e.g., the position where the light intensity is at its maximum) is away from the rib portion 4 and close to the groove portion 5. According to the first embodiment of the present invention, it is possible to shift the position of the light wave to the side of groove portion 5 by providing the groove portion 5. As a result, it is possible to reduce the area where the light wave overlaps with a boundary area between the waveguide layer 3 and the rib portion 4 and the outside air, and it is possible to suppress scattering by the boundary area and reduce the propagation loss in the optical waveguide of the optical waveguide element 1.

Next, an example configuration of an optical modulator including the optical waveguide element 1 in the first embodiment of the present invention will be described.

Figure 6:
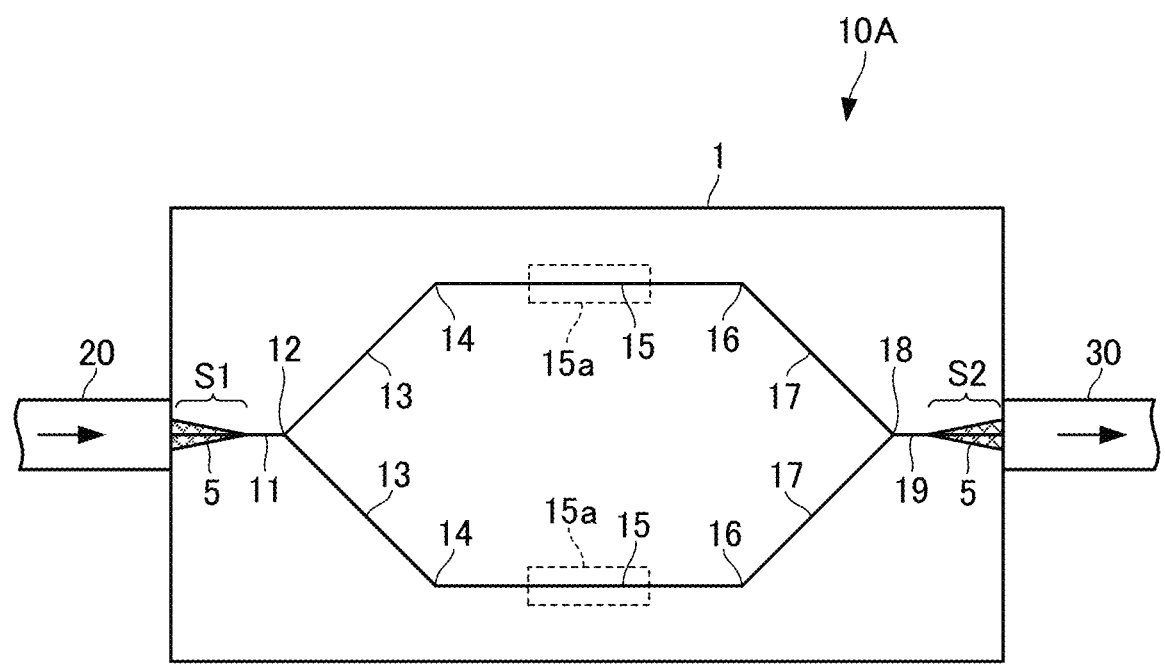
FIG. 6 is a plan view of a first example of an optical modulator including an optical waveguide element in a first embodiment of the present invention.

FIG. 6 is a plan view of a first example of an optical modulator including an optical waveguide element 1 in a first embodiment of the present invention. In FIG. 6, in order to represent the shape of the groove portion 5 in the drawing, the waveguide layer 3 and the rib portion 4 are shown transparent, the optical waveguide formed directly below the rib portion 4 is represented as a line, and the material filled in the groove portion 5 is shown in shading.

The optical modulator 10A shown in FIG. 6 is an optical modulator having a Mach-Zehnder-type optical waveguide and comprises an optical waveguide element 1, an input side optical fiber 20 and an output side optical fiber 30 connected to the optical waveguide element 1.

The input side optical fiber 20 is an optical fiber for introducing the light wave into the optical waveguide of the optical waveguide element 1. The output side optical fiber 30 is an optical fiber for outputting the light wave from the optical waveguide of the optical waveguide element 1. In FIG. 6, the direction of propagation of the light wave in the input side optical fiber 20 and the output side optical fiber 30 is indicated by arrows.

The optical waveguide element 1 has a Mach-Zehnder-type optical waveguide formed by a rib portion 4 (not shown in FIG. 6). The optical waveguide formed in the optical waveguide element 1 consists of an input waveguide 11, two first-branch waveguides 13, two parallel waveguides 15, two second-branch waveguides 17, and an output waveguide 19.

The input waveguide 11 is connected to the input side optical fiber 20 at the input end, and the light wave is introduced from the input side optical fiber 20. The input waveguide 11 is branched into two first-branch waveguides 13 at the bifurcation portion 12 consisting of an optical coupler or the like. The two first-branch waveguides 13 are respectively bent at the first bending portions 14 to form two parallel waveguides 15 which are parallel to each other. The two parallel waveguides 15 are respectively bent at the second bending portions 16 to form two second-branch waveguides 17. The two second-branch waveguides 17 are synthesized again in a synthesis unit 18 consisting of an optical coupler or the like to form a single output waveguide 19. The output waveguide 19 is connected to the output side optical fiber 30 at the output end, and the light wave synthesized at the synthesis unit 18 is outputted to the output side optical fiber 30.

In a Mach-Zehnder-type optical waveguide, a modulation unit 15a is usually provided in each of the two parallel waveguides 15. The modulation unit 15a adjusts the phase of the light wave by modulating the light wave propagating through each of the two parallel waveguides 15 accordingly. For modulating the light wave, modulation electrodes, including signal electrodes and ground electrodes, and transmission lines and the like for transmitting electrical signals to the modulation electrodes are disposed on the waveguide layer 3, but none of these components are shown in FIG. 6.

In the optical waveguide element 1 shown in FIG. 6, the groove portion 5 is formed in a part of the input waveguide 11 (section S1 in FIG. 6). The section S1 in which the groove portion 5 is formed is, for example, the section from the input end of the input waveguide 11 to which the input side optical fiber 20 is connected to the middle of the input waveguide 11. The dimension of the section S1 is preferably long enough not to cause propagation loss due to rapid variations in the beam shape, and it depends on the dimensions of the waveguide layer 3, the rib portion 4, and the like, but is set to about 500 μm or more, for example.

Further, in the optical waveguide element 1 shown in FIG. 6, the groove portion 5 is formed in a part of the output waveguide 19 (section S2 in FIG. 6). The section S2 in which the groove portion 5 is formed is, for example, the section from the middle of the output waveguide 19 to the output end of the output waveguide 19 to which the output side optical fiber 30 is connected. The dimension of the section S2 is preferably long enough not to cause propagation loss due to rapid variations in the beam shape, and it depends on the dimensions of the waveguide layer 3, the rib portion 4, and the like, but is set to about 500 μm or more, for example.

On the other hand, the optical waveguide of the optical waveguide element 1, other than sections S1 and S2, can adopt any structure, such as the structure of an ordinary ribbed waveguide in which the groove portion 5 is not formed, for example. In particular, a structure with a higher modulation efficiency of the light wave can be selected in the modulation unit 15*a*, which enables the modulation of the light wave in the modulation unit 15*a* to be performed efficiently.

In section S1, the groove portion 5 formed at the input end of the input waveguide 11 is formed in such a way that the dimension in the height direction from the top surface of the rib portion 4 to the bottom surface of the groove portion 5 and the dimension in the width direction of the rib portion 4 are approximately the same, as shown in the cross-sectional structure shown in FIG. 4A. Further, the groove portion 5 is formed in such a way that the dimension in the width direction of the rib portion 4 and the dimension in the width direction of the groove portion 5 is approximately the same. By forming the groove portion 5 in this way, the light wave introduced from the input side optical fiber 20 is introduced into the input waveguide 11 of the optical waveguide element 1 while maintaining a beam shape close to an approximately perfect circle. This makes it possible to reduce the coupling loss at the coupling portion between the input side optical fiber 20 and the optical waveguide element 1.

In section S1, the groove portion 5 is formed in such a way that the dimension in the width direction is continuously decreasing along the direction of propagation of the light wave, and the groove portion 5 is formed in such a way that the dimension in the width direction becomes zero in the middle of the input waveguide 11 and the groove portion 5 disappears. By forming the groove portion 5 in this way, it is possible to vary the beam shape from a beam shape close to an approximately perfect circle to a beam shape compatible with a ribbed waveguide in the input waveguide 11 while preventing the occurrence of propagation loss, and to guide the light wave smoothly into a normal ribbed waveguide.

In section S2, the groove portion 5 is formed in the middle of the output waveguide 19 as a starting point for the formation of the groove portion, and from this starting point, the dimension in the width direction along the direction of propagation of the light wave is continuously increased. By forming the groove portion 5 in this way, it is possible to vary the beam shape of the output waveguide 19 from a beam shape compatible with a ribbed waveguide to a beam shape close to an approximately perfect circle while preventing the occurrence of propagation loss, and to guide the light wave smoothly from an ordinary ribbed waveguide into an optical fiber.

In section S2, the groove portion 5 formed at the output end of the output waveguide 19 is formed in such a way that the dimension in the height direction from the top surface of the rib portion 4 to the bottom surface of the groove portion 5 and the dimension in the width direction of the rib portion 4 are approximately the same, as shown in the cross-sectional structure shown in FIG. 4A. Further, the groove portion 5 is formed in such a way that the dimension in the width direction of the rib portion 4 and the dimension in the width direction of the groove portion 5 are approximately the same. By forming the groove portion 5 in this way, the light wave is outputted from the output waveguide 19 to the output side optical fiber 30 in a beam shape close to an approximately perfect circle. This makes it possible to reduce the coupling loss at the coupling portion between the output side optical fiber 30 and the optical waveguide element 1.

Figure 7:
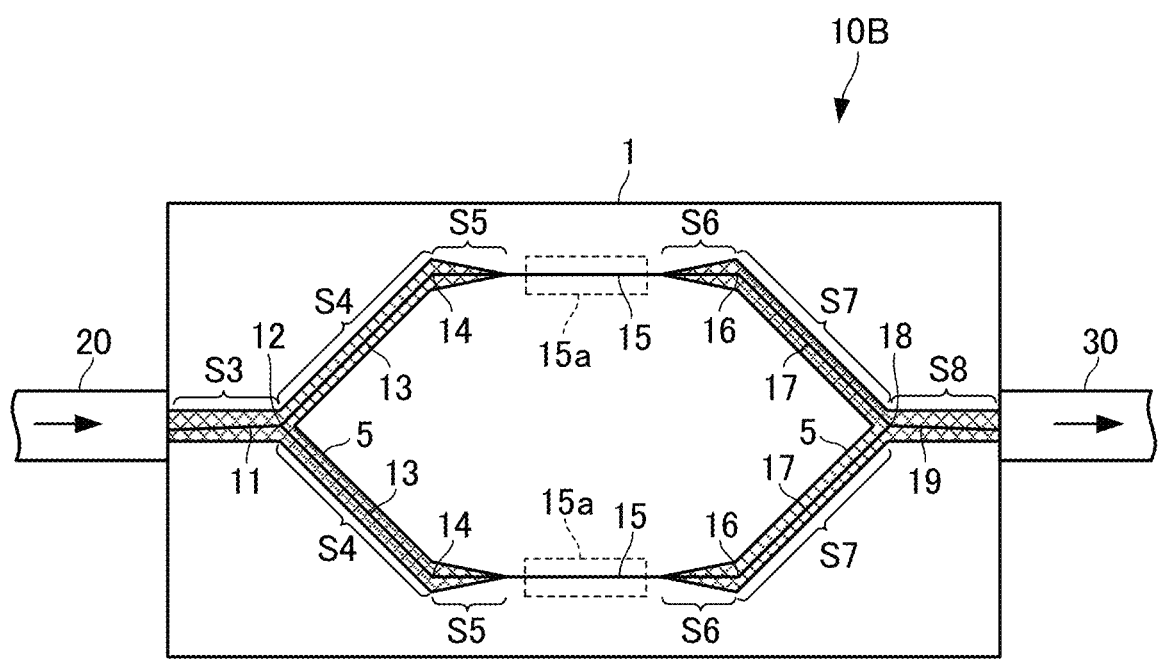
FIG. 7 is a plan view of a second example of an optical modulator including an optical waveguide element in a first embodiment of the present invention.

FIG. 7 is a plan view of a second example of an optical modulator including an optical waveguide element 1 in a first embodiment of the present invention. In FIG. 7, as in FIG. 6, in order to represent the shape of the groove portion 5 in the drawing, the waveguide layer 3 and the rib portion 4 are shown transparent, the optical waveguide formed directly below the rib portion 4 is represented as a line, and the material filled in the groove portion 5 is shown in shading.

Compared with the optical modulator 10A shown in FIG. 6, in the optical modulator 10B shown in FIG. 7, the section in which the groove portion 5 is formed in the optical waveguide element 1 is different. The groove portion 5 formed in the optical waveguide element 1 shown in FIG. 7 will be described below.

In the optical waveguide element 1 shown in FIG. 7, the groove portion 5 is formed in the input waveguide 11 (section S3 in FIG. 7), the first-branch waveguide 13 (section S4 in FIG. 7), and a portion of the parallel waveguide 15 (section S5 in FIG. 7). The section S3 is a section that includes the entire input waveguide 11. Section S4 is a section that includes the entire first-branch waveguide 13. Section S5 is the section from the first bending portion 14 to the middle of the parallel waveguide 15. However, the section S5 does not overlap with the modulation unit 15*a*, and the end of the section S5 is located between the first bending portion 14 and the modulation unit 15*a*. The length of the section S5 is preferably long enough not to cause propagation loss due to rapid variations in the beam shape, and is set to about 500 μm or more, for example, depending on the dimensions of the waveguide layer 3 and the rib portion 4. It is possible to shift the position of the light wave towards the groove portion 5 in the section with the groove portion 5. As a result, it is possible to reduce the area where the light wave overlaps with a boundary area between the waveguide layer 3 and the rib portion 4 and the outside air, and it is possible to suppress scattering by the boundary area and reduce the propagation loss in the optical waveguide of the optical waveguide element 1.

In the optical waveguide element 1 shown in FIG. 7, the groove portion 5 is formed in a portion of the parallel waveguide 15 (section S6 in FIG. 7), the second-branch waveguide 17 (section S7 in FIG. 7), and the output waveguide 19 (section S8 in FIG. 7). Section S6 is the section from the middle of the modulation unit 15a to the second bending portion 16. However, the section S6 does not overlap with the modulation unit 15a, and the starting end of the section S6 is located between the modulation unit 15a and the second bending portion 16. The length of the section S6 is preferably long enough not to cause propagation loss due to rapid variations in the beam shape, and is set to about 500 μm or more, for example, depending on the dimensions of the waveguide layer 3 and the rib portion 4. Section S7 is a section that includes the entire second-branch waveguide 17. Section S8 is a section that includes the entire output waveguide 19. It is possible to shift the position of the light wave towards the groove portion 5 in the section with the groove portion 5. As a result, it is possible to reduce the area where the light wave overlaps with a boundary area between the waveguide layer 3 and the rib portion 4 and the outside air, and it is possible to suppress scattering by the boundary area and reduce the propagation loss in the optical waveguide of the optical waveguide element 1.

On the other hand, the optical waveguide of the optical waveguide element 1, other than sections S3 to S8, can adopt any structure, such as the structure of an ordinary ribbed waveguide in which the groove portion 5 is not formed, for example. In particular, a structure with a higher modulation efficiency of the light wave can be selected in the modulation unit 15a, which enables the modulation of the light wave in the modulation unit 15a to be performed efficiently.

In section S3, the groove portion 5 formed at the input end of the input waveguide 11 is formed in such a way that the dimension in the height direction from the top surface of the rib portion 4 to the bottom surface of the groove portion 5 and the dimension in the width direction of the rib portion 4 are approximately the same, as shown in the cross-sectional structure shown in FIG. 4A. Further, the groove portion 5 is formed in such a way that the dimension in the width direction of the rib portion 4 and the dimension in the width direction of the groove portion 5 are approximately the same. By forming the groove portion 5 in this way, the light wave introduced from the input side optical fiber 20 is introduced into the input waveguide 11 of the optical waveguide element 1 while maintaining a beam shape close to an approximately perfect circle. This makes it possible to reduce the coupling loss at the coupling portion between the input side optical fiber 20 and the optical waveguide element 1.

In section S3, the groove portion 5 is formed along the direction of propagation of the light wave to have the same dimension in the width direction as that formed at the input end. In other words, in section S3, the dimension in the width direction of the groove portion 5 does not vary and is kept constant in dimension. By forming the groove portion 5 in this way, the light wave can propagate in the input waveguide 11 while maintaining a beam shape close to an approximately perfect circle, thus preventing the occurrence of propagation loss.

Similarly, in section S4, the groove portion 5 is formed in such a way that its dimension in the width direction does not vary along the direction of propagation of the light wave and has the same dimension in the width direction as in section S3. By forming the groove portion 5 in this way, the light wave can propagate in the first-branch waveguide 13 while maintaining a beam shape close to an approximately perfect circle, thus preventing the occurrence of propagation loss.

In section S5, the groove portion 5 formed at the first bending portion 14, which is a starting end of the section S5, is formed in such a way that the dimension in the height direction from the top surface of the rib portion 4 to the bottom surface of the groove portion 5 and the dimension in the width direction of the rib portion 4 are approximately the same, as shown in the cross-sectional structure shown in FIG. 4A. Further, the groove portion 5 is formed in such a way that the dimension in the width direction of the rib portion 4 and the dimension in the width direction of the groove portion 5 are approximately the same. By forming the groove portion 5 in this way, the light wave propagating through the first-branch waveguide 13 is introduced into the parallel waveguide 15 while maintaining a beam shape close to an approximately perfect circle. This makes it possible to reduce the loss of the light wave when the light wave is introduced from the first-branch waveguide 13 (section S4) to the parallel waveguide 15 (section S5).

In section S5, the groove portion 5 is formed in such a way that the dimension in the width direction is continuously decreasing along the direction of propagation of the light wave, and the groove portion 5 is formed in such a way that the dimension in the width direction becomes zero in the middle of the parallel waveguide 15 (the first stage of the modulation section 15a) and the groove portion 5 disappears. By forming the groove portion 5 in this way, it is possible to vary the beam shape from a beam shape close to an approximately perfect circle to a beam shape compatible with a ribbed waveguide in the parallel waveguide 15 while preventing the occurrence of propagation loss, and to guide the light wave smoothly into a normal ribbed waveguide.

In section S6, the groove portion 5 is formed in the middle of the parallel waveguide 15 (after the modulation section 15a) as a starting point for the formation of the groove portion, and from this starting point, the dimension in the width direction along the direction of propagation of the light wave is continuously increased. By forming the groove portion 5 in this way, it is possible to vary the beam shape from a beam shape compatible with a ribbed waveguide to a beam shape close to an approximately perfect circle in the parallel waveguide 15 while preventing the occurrence of propagation loss, and to smoothly guide the light wave from a normal ribbed waveguide to an optical fiber.

In section S6, the groove portion 5 formed in the second bending portion 16, which is the end of section S6, is formed in such a way that the dimension in the height direction from the top surface of the rib portion 4 to the bottom surface of the groove portion 5 and the dimension in the width direction of the rib portion 4 are approximately the same, as shown in the cross-sectional structure shown in FIG. 4A. Further, the groove portion 5 is formed in such a way that the dimension in the width direction of the rib portion 4 and the dimension in the width direction of the groove portion 5 are approximately the same. By forming the groove portion 5 in this way, the light wave propagating through the parallel waveguide 15 is introduced into the second-branch waveguide 17 while maintaining a beam shape close to an approximately perfect circle. This makes it possible to reduce the loss when the light wave is introduced from the parallel waveguide 15 (section S6) to the second-branch waveguide 17 (section S7).

In section S7, the groove portion 5 is formed along the direction of propagation of the light wave to have the same dimension in the width direction as that formed at the end of section S6. In other words, in section S7, the dimension in the width direction of the groove portion 5 does not vary and is kept constant in dimension. By forming the groove portion 5 in this way, the light wave can propagate in the second-branch waveguide 17 while maintaining a beam shape close to an approximately perfect circle, thus preventing the occurrence of propagation loss.

Similarly, in section S8, the groove portion 5 is formed in such a way that its dimension in the width direction does not vary along the direction of propagation of the light wave and has the same dimension in the width direction as in section S7. By forming the groove portion 5 in this way, the light wave can propagate in the output waveguide 19 while maintaining a beam shape close to an approximately perfect circle, thus preventing the occurrence of propagation loss. Furthermore, the light wave is outputted from the output waveguide 19 to the output side optical fiber 30 in a beam shape close to an approximately perfect circle. This makes it possible to reduce the coupling loss at the coupling portion between the output side optical fiber 30 and the optical waveguide element 1.

In the optical modulator 10A shown in FIG. 6, the section S1 in which the groove portion 5 is tapered in the input waveguide 11 and the section S2 in which the groove portion 5 is reverse tapered (flared) in the output waveguide 19 are provided. In the optical modulator 10B shown in FIG. 7, the section S5 in which the groove portion 5 is tapered and the section S6 in which the groove portion 5 is reverse tapered (flared) in the parallel waveguides 15. However, the section where the groove portion 5 is tapered or reverse tapered can be provided at any location that does not overlap with the modulation unit 15, for example, it may be provided in the first-branch waveguides 13 or the second-branch waveguides 17.

The manufacturing process of the optical waveguide element 1 in the first embodiment of the present invention will be described hereinafter.

Figure 8A:
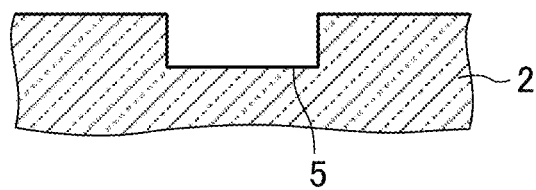
FIG. 8A shows a first example of a manufacturing process of the optical waveguide element in a first embodiment of the present invention, showing a state after a first step.
Figure 8B:
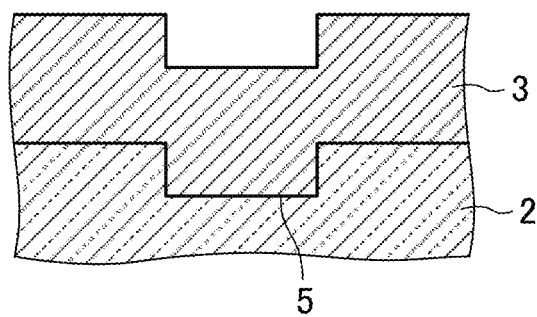
FIG. 8B shows a first example of a manufacturing process of the optical waveguide element in a first embodiment of the present invention, showing a state after a second step.
Figure 8C:
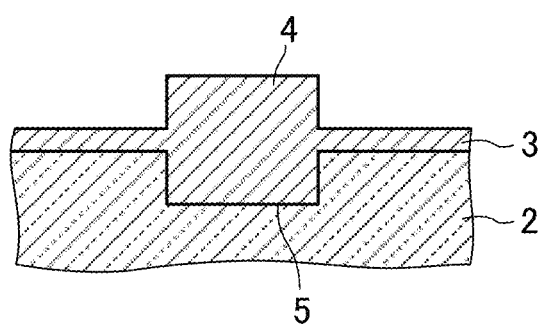
FIG. 8C shows a first example of a manufacturing process of the optical waveguide element in a first embodiment of the present invention, showing a state after a third step.

A first example of the manufacturing process of the optical waveguide element 1 will be described with reference to FIG. 8A to FIG. 8C. Although FIG. 8A to FIG. 8C show, as an example, a case in which the dimension in the width direction of the groove portion 5 is approximately the same as the dimension in the width direction of the rib portion 4, the dimension in the width direction of the groove portion 5 is set appropriately to match the intended beam shape in the optical waveguide.

In the first step, a portion of the supporting substrate 2 is removed by dry etching and the like, for example, to form the groove portion 5. FIG. 8A shows the state after the first step.

In the second step, a waveguide layer 3 made of a material having an electro-optic effect, such as LN, is crystal grown on the supporting substrate 2 on which the groove portion 5 is formed, for example by epitaxial growth and the like. FIG. 8B shows the state after the second step.

In the third step, for example, dry etching is used to remove the portions other than the rib portion 4 to form the rib portion 4 on the waveguide layer 3. FIG. 8C shows the state after the third step.

The manufacturing process of the optical waveguide element 1 described with reference to FIG. 8A to FIG. 8C is suitable when the material to be filled in the groove portion 5 and the material of the waveguide layer 3 (e.g., LN, and the like) are the same. Filling of the material into the groove portion 5 and growth of the waveguide layer 3 can be performed simultaneously in the second step, making it possible to manufacture the optical waveguide element 1 in the first embodiment of the present invention in a small number of steps.

A second example of the manufacturing process of the optical waveguide element 1 will be described with reference to FIG. 9A to FIG. 9D. Although FIG. 9A to FIG. 9D show, as an example, a case in which the dimension in the width direction of the groove portion 5 is approximately the same as the dimension in the width direction of the rib portion 4, the dimension in the width direction of the groove portion 5 is set appropriately to match the intended beam shape in the optical waveguide.

Figure 9A:
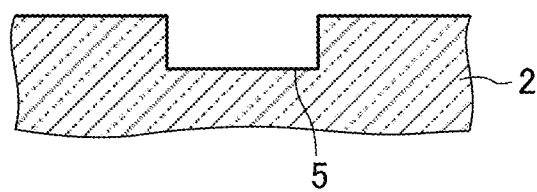
FIG. 9A shows a second example of a manufacturing process of the optical waveguide element in a first embodiment of the present invention, showing a state after a first step.

In the first step, a portion of the supporting substrate 2 is removed by dry etching and the like, for example, to form the groove portion 5. FIG. 9A shows the state after the first step.

Figure 9B:
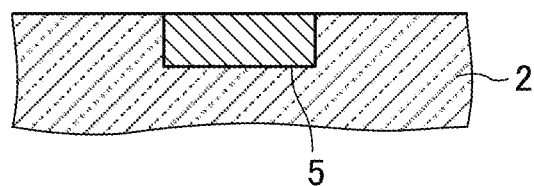
FIG. 9B shows a second example of a manufacturing process of the optical waveguide element in a first embodiment of the present invention, showing a state after a second step.

In the second step, the groove portion 5 is filled with the desired material. The surface of the support substrate 2 may be polished and smoothed after filling the groove portion 5 with the desired material to make it easier to bond the substrate to be the waveguide layer 3 to the supporting substrate 2 in a subsequent third step. FIG. 9B shows the state after the second step.

Figure 9C:
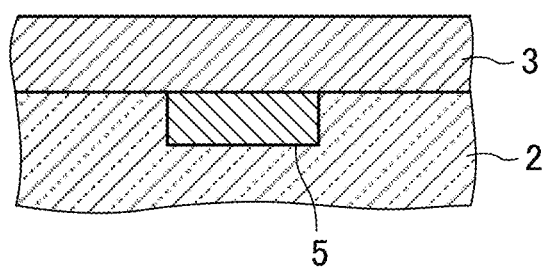
FIG. 9C shows a second example of a manufacturing process of the optical waveguide element in a first embodiment of the present invention, showing a state after a third step.

In the third step, the substrate to be the waveguide layer 3 is bonded to the supporting substrate 2 with the desired material embedded in the groove portion 5. FIG. 9C shows the state after the third step.

Figure 9D:
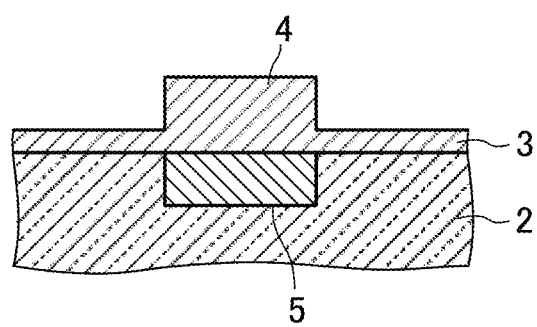
FIG. 9D shows a second example of a manufacturing process of the optical waveguide element in a first embodiment of the present invention, showing a state after a fourth step.

In the fourth step, for example, dry etching is used to remove the portions other than the rib portion 4 to form the rib portion 4 on the waveguide layer 3. FIG. 9D shows the state after the fourth step.

The manufacturing process of the optical waveguide element 1 described with reference to FIG. 9A to FIG. 9D is suitable for selecting the material to be filled in the groove portion 5 accordingly. For example, the same material (e.g., LN and the like) as the waveguide layer 3 may be selected as the material to be filled in the groove portion 5 in the second step, or SiN or resin and the like may be selected. In addition, the waveguide layer 3 can be stacked on the supporting substrate 2 by the substrate bonding in the third step, making it possible to manufacture the optical waveguide element 1 in the first embodiment of the present invention by a simple process.

Second Embodiment

An optical waveguide element in the second embodiment of the present invention will be explained.

In the optical waveguide element 1 in the first embodiment of the invention described above, the cross-sectional area of the groove is set up so that the cross-sectional area of the groove varies continuously by continuously varying the dimensions of the groove portion 5 in the width direction along the direction of extension of the rib portion 4 while keeping the dimensions in the height direction of the groove portion 5 constant. On the other hand, as shown in FIG. 10, in the optical waveguide element 41 in the second embodiment of the present invention, the cross-sectional area of the groove is set up so that the cross-sectional area of the groove varies continuously by continuously varying the dimensions in the height direction of the groove 5 along the direction of extension of the rib portion 4, while keeping the dimensions in the width direction of the groove portion 5 constant.

The optical waveguide element 41 in the second embodiment of the present invention has a common configuration with the optical waveguide element 1 in the first embodiment of the present invention, except that the dimensions in the height direction of the groove portion 5 vary continuously while the dimensions in the width direction of the groove portion 5 remain constant. The description of the common configuration is omitted here.

Figure 10:
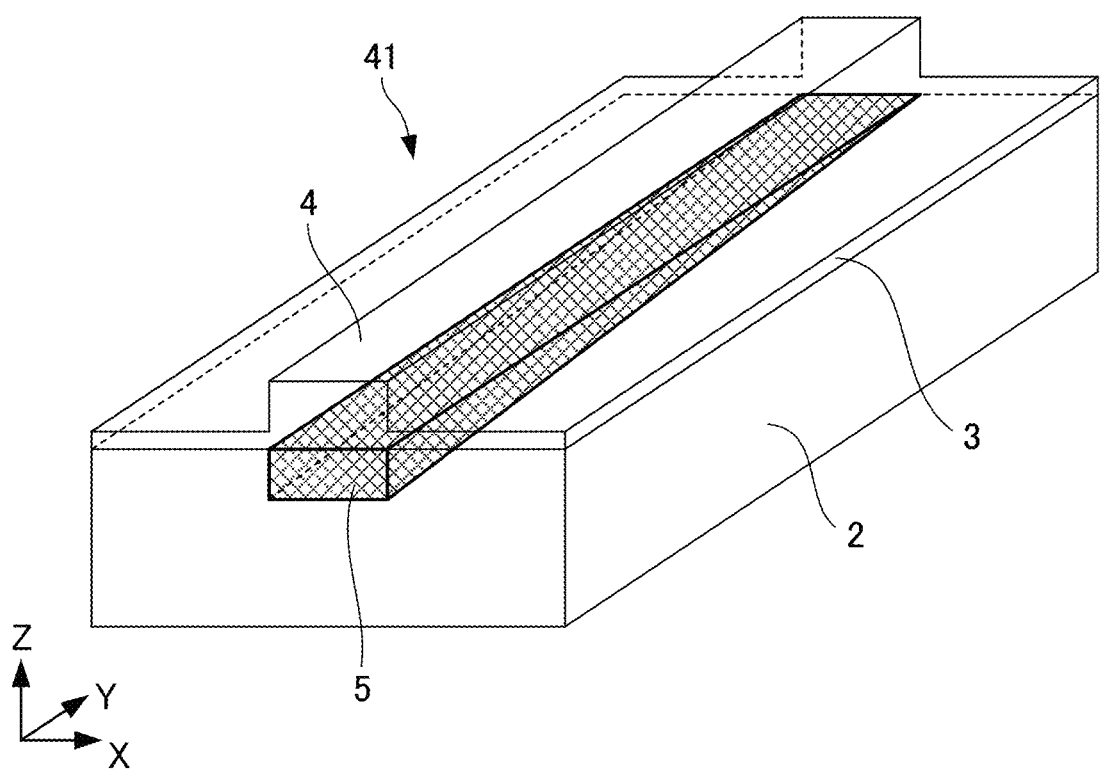
FIG. 10 is a perspective view of a structure in the vicinity of the optical waveguide of an optical waveguide element in a second embodiment of the present invention.

FIG. 10 is a perspective view of a structure in the vicinity of the optical waveguide of an optical waveguide element 41 in a second embodiment of the present invention. In the drawing, the width direction of the optical waveguide element 41 is defined as X axis, the longitudinal direction of the optical waveguide element 41 is defined as Y axis, and the height direction of the optical waveguide element 41 is defined as Z axis. As in FIG. 1, in FIG. 10, the supporting substrate 2, the waveguide layer 3 and the rib portion 4 are represented only as contours and transparent in order to represent the shape of the groove portion 5 in the drawing, and the material filled in the groove portion 5 is shown in shading.

On the front side of the perspective view of FIG. 10, the dimension in the height direction of the groove portion 5 is set to be large, and toward the back of the drawing, the dimension in the height direction of the groove portion 5 gradually decreases, and on the farthest side of the drawing, the dimension in the height direction of the groove portion 5 is set to be zero. "The dimension in the height direction of the groove portion 5 is set to be zero" means that the groove portion 5 is not formed or the groove portion 5 has disappeared.

Figure 11A:
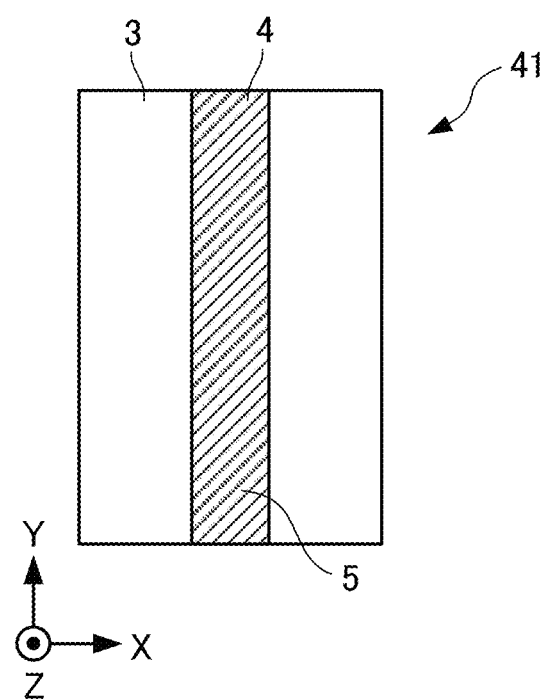
FIG. 11A is a plan view of the structure in the vicinity of the optical waveguide of the optical waveguide element shown in FIG. 10.
Figure 11B:
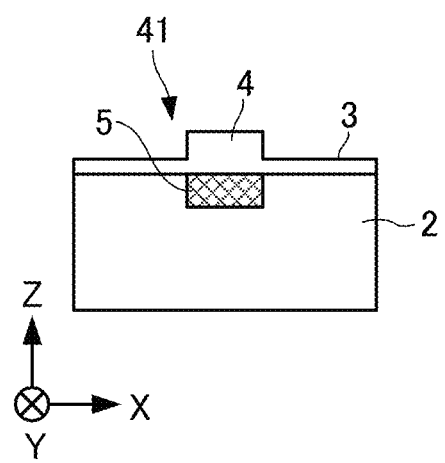
FIG. 11B is a front view of the structure in the vicinity of the optical waveguide of the optical waveguide element shown in FIG. 10.
Figure 11C:
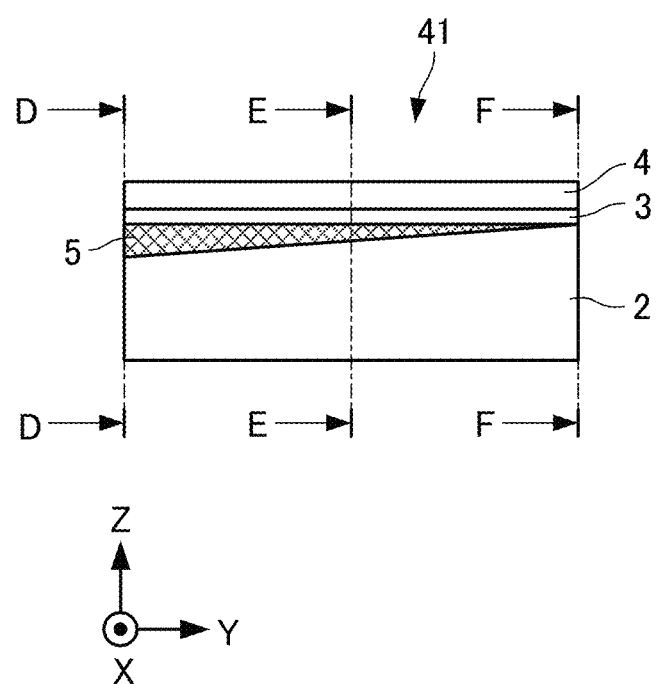
FIG. 11C is a side view of the structure in the vicinity of the optical waveguide of the optical waveguide element shown in FIG. 10.

FIG. 11A to FIG. 11C are three-plane drawings of the structure in the vicinity of the optical waveguide of the optical waveguide element 41 shown in FIG. 10. FIG. 11A is a plan view of the structure in the vicinity of the optical waveguide of the optical waveguide element 41 shown in FIG. 10. FIG. 11B is a front view of the structure in the vicinity of the optical waveguide of the optical waveguide element 41 shown in FIG. 10. FIG. 11C is a side view of the structure in the vicinity of the optical waveguide of the optical waveguide element 41 shown in FIG. 10. In FIG. 11A to FIG. 11C, as in FIG. 10, the supporting substrate 2, the waveguide layer 3 and the rib portion 4 are represented only as contours and transparent in order to represent the shape of the groove portion 5 in the drawings, and the material filled in the groove portion 5 is shown in shading.

The continuous variation of the dimension in the height direction of the groove portion 5 along the direction of extension of the rib portion 4 is clearly shown in particular in the plan view of FIG. 11C. The dimension in the height direction of the groove portion 5 is set to gradually decrease along the Y-axis direction of FIG. 11A, and the groove portion 5 has a tapered shape that tapers along the Y-axis direction in the plan view of FIG. 11C. The length of the groove portion 5 in the Y-axis direction (the longitudinal dimension of the tapered shape) is preferably long enough not to cause propagation loss due to rapid variations in the beam shape, for example, to be set at 500 µm or more.

Further, referring to the cross-sectional views shown in FIG. 12A to FIG. 12C, the fact that the groove portion 5 has a tapered shape along the direction of extension of the rib portion 4 will be described.

Figure 12A:
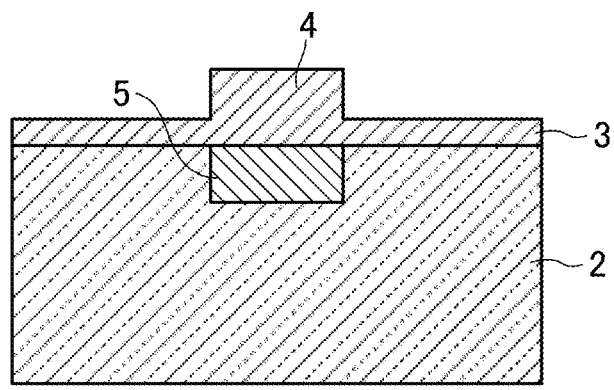
FIG. 12A is a cross-sectional structure in the vicinity of the optical waveguide of the optical waveguide element in the second embodiment of the present invention, and it is the D-D cross-sectional view of FIG. 11C.

FIG. 12A is a D-D cross-sectional view in the side view of FIG. 11C and shows the cross-sectional structure of the front side in the perspective view of FIG. 10. In the D-D cross-sectional view of FIG. 12A, the dimension (height h3 in FIG. 2) in the height direction from the top surface of the rib portion 4 to the bottom surface of the groove portion 5 is approximately the same as the dimension (width w1 in FIG. 2) in the width direction of the rib portion 4. The dimension (depth h2 in FIG. 2) in the height direction of the groove portion 5 is approximately the same as the dimension (height h1 in FIG. 2) in the height direction of the rib portion 4, and the dimension (width w2 in FIG. 2) in the width direction of the groove portion 5 is approximately the same as the dimension (width w1 in FIG. 2) in the width direction of the rib portion 4. That is, the cross-sectional shape of the rib portion 4 protruding from the waveguide layer 3 and the cross-sectional shape of the groove portion 5 excavated in the supporting substrate 2 are symmetrical with respect to the waveguide layer 3.

Figure 12B:
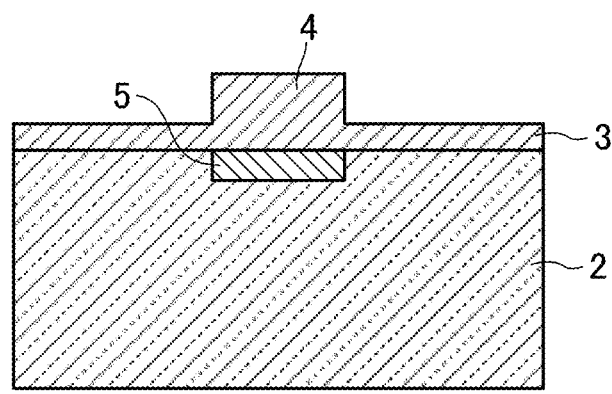
FIG. 12B is a cross-sectional structure in the vicinity of the optical waveguide of the optical waveguide element in the second embodiment of the present invention, and it is the E-E cross-sectional view of FIG. 11C.

FIG. 12B is an E-E cross-sectional view in the side view of FIG. 11C and shows the cross-sectional structure of an approximately center section in the perspective view of FIG. 10. In the perspective view of FIG. 10, the dimension in the height direction of the groove portion 5 continuously decreases as it proceeds along the Y-axis direction from the front side to the back side. And in the cross-sectional structure of the approximately center section shown in the E-E cross-sectional view of FIG. 12B, the dimension (depth h2 of FIG. 2) in the height direction of the groove portion 5 is about half of the dimension (height h1 of FIG. 2) in the height direction of the rib portion 4.

Figure 12C:
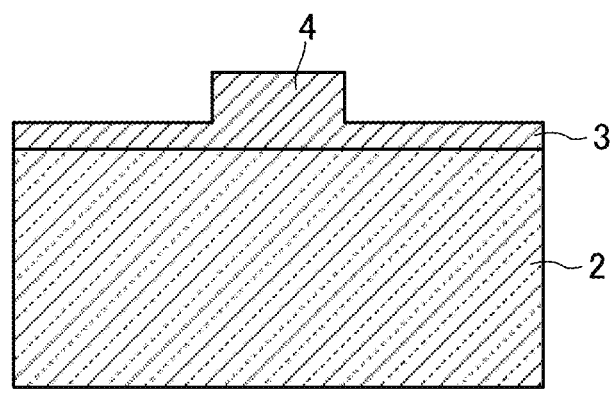
FIG. 12C is a cross-sectional structure in the vicinity of the optical waveguide of the optical waveguide element in the second embodiment of the present invention, and it is the F-F cross-sectional view of FIG. 11C.

FIG. 12C is an F-F cross-sectional view in the side view of FIG. 11C and shows the cross-sectional structure at the farthest end in the perspective view of FIG. 10. The dimension in the height direction of the groove portion 5 continuously decreases as it proceeds along the Y-axis direction, and in the farthest cross-sectional structure shown in the F-F cross-sectional view of FIG. 12C, the dimension (depth h2 in FIG. 2) in the height direction of the groove portion 5 is zero, and the groove portion 5 has disappeared. The cross-sectional structure shown in the F-F cross-sectional view of FIG. 12C is identical to the cross-sectional structure of a normal ribbed waveguide.

Figure 13A:
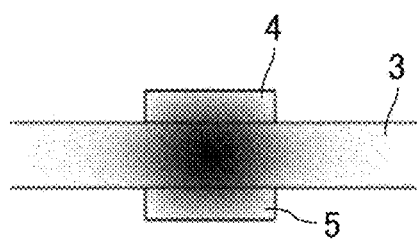
FIG. 13A shows a results of field intensity simulation of the optical waveguide element in the second embodiment of the present invention, showing the light intensity distribution in the cross-sectional structure of FIG. 12A.
Figure 13B:
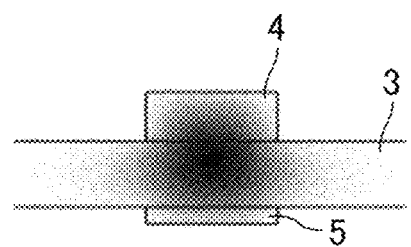
FIG. 13B shows a results of field intensity simulation of the optical waveguide element in the second embodiment of the present invention, showing the light intensity distribution in the cross-sectional structure of FIG. 12B.
Figure 13C:
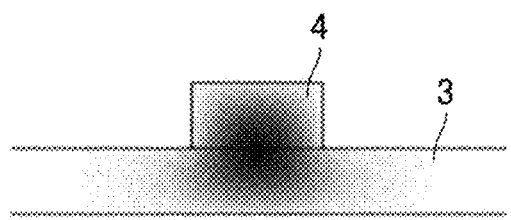
FIG. 13C shows a results of field intensity simulation of the optical waveguide element in the second embodiment of the present invention, showing the light intensity distribution in the cross-sectional structure of FIG. 12C.

FIG. 13A to FIG. 13C show results of a field intensity simulation of the optical waveguide element 41 in the second embodiment of the present invention. FIG. 13A shows the light intensity distribution in the cross-sectional structure of FIG. 12A. FIG. 13B shows the light intensity distribution in the cross-sectional structure of FIG. 12B. FIG. 13C shows the light intensity distribution in the cross-sectional structure of FIG. 12C. In FIG. 13A to FIG. 13C, the light intensity distribution is represented by shading, where higher concentration indicates higher light intensity, and lower concentration indicates weaker light intensity.

In the cross-sectional structure shown in FIG. 13A, the dimensions in the height direction from the top surface of the rib portion 4 to the bottom surface of the groove portion 5 and the width direction of the rib portion 4 are approximately the same. Furthermore, the dimension in the width direction of the rib portion 4 and the dimension in the width direction of the groove portion 5 are approximately the same. That is, the area surrounded by the sides of the rib portion 4 and the sides of the groove portion 5 is approximately a square with an aspect ratio of 1:1. This makes the beam shape of the light wave propagating in the optical waveguide an approximately perfect circle, similar to that of the light wave propagating in the optical fiber, as shown in FIG. 13A.

The cross-sectional structure shown in FIG. 13B has smaller dimensions in the height direction of the groove portion 5 compared to FIG. 13A. As a result, the light wave propagating through the optical waveguide has less area to spread in the groove portion 5 and more area to spread in the rib portion 4. The beam shape of the light wave is slightly distorted, as shown in FIG. 13B.

The cross-sectional structure shown in FIG. 13C has the same shape as a normal ribbed waveguide with the groove portion 5 disappearing. Therefore, the beam shape of the light wave is distorted so that it enters the rib portion 4, as shown in FIG. 13C.

When the light wave propagates in the positive direction of the Y-axis in FIG. 10, the beam shape of the light wave is gradually distorted (as shown in FIG. 13B) from a beam shape close to an approximately perfect circle (as shown in FIG. 13A) and varies continuously to a beam shape that is identical to that of a ribbed waveguide (as shown in FIG. 13C). Since the dimension in the height dimension of the groove portion 5 varies continuously, the beam shape shown in FIG. 13A to FIG. 13C also varies continuously.

In the second embodiment of the present invention, by providing the groove portion 5 such that the dimensions in the height direction of the groove portion 5 are continuously decreased with respect to the direction of propagation of the light wave, it is possible to continuously vary the beam shape of the light wave from the beam shape of the light wave propagating in the optical fiber (a shape close to an approximately perfect circle) to the beam shape of the light wave propagating in a normal ribbed waveguide. Since the beam shape of the light wave is continuously changing, it is possible to prevent the loss caused by discontinuous and rapid variations of the beam shape of the light wave.

Furthermore, by providing the groove portion 5 formed such that the beam shape of the light wave is close to an approximately perfect circle (as shown in FIG. 13A) at the coupling portion with the optical fiber that introduces the light wave into the optical waveguide element 41, it is possible to suppress the mismatch in the beam shape between the light wave introduced from the optical fiber and the light wave introduced from the optical fiber and propagating through the optical waveguide of the optical waveguide element 41. As a result, it is possible to reduce the coupling loss at the coupling portion between the optical fiber and the optical waveguide element 41.

Conversely, when the light wave propagates in the negative direction of the Y axis of FIG. 10, the beam shape of the light wave gradually varies from the same beam shape as the ribbed waveguide (as shown in FIG. 13C) to a less distorted shape (as shown in FIG. 13B), and varies continuously to a beam shape that is an approximately perfect circle (as shown in FIG. 13A). Since the dimension in the height direction of the groove portion 5 varies continuously, the beam shape shown in FIG. 13A to FIG. 13C also varies continuously.

In the second embodiment of the present invention, by providing the groove portion 5 such that the dimension in the width direction of the groove portion 5 is continuously increased with respect to the direction of propagation of the light wave, it is possible to continuously vary the beam shape of the light wave from the beam shape of the light wave propagating in a normal ribbed waveguide to the beam shape of the light wave propagating in the optical fiber (a shape close to an approximately perfect circle). Since the beam shape of the light wave is continuously changing, it is possible to prevent the loss caused by discontinuous and rapid variations of the beam shape of the light wave.

Furthermore, by providing the groove portion 5 formed such that the beam shape of the light wave is close to an approximately perfect circle (as shown in FIG. 13A) at the coupling portion with the optical fiber that outputs the light wave from the optical waveguide element 41, it is possible to suppress the mismatch in the beam shape between the light wave introduced from the optical fiber and propagating in the optical waveguide of the optical waveguide element 41 and the light wave outputted from the optical fiber. As a result, it is possible to reduce the coupling loss at the coupling portion between the optical fiber and the optical waveguide element 41.

In addition, when the groove portion 5 is provided, the light wave spreads out to enter the groove portion 5 so that the position of the light wave (e.g., the position where the light intensity is at its maximum) is away from the rib portion 4 and close to the groove portion 5. According to the second embodiment of the present invention, as in the first embodiment of the present invention, it is possible to shift the position of the light wave to the side of groove portion 5 by providing the groove portion 5. As a result, it is possible to reduce the area where the light wave overlaps with a boundary area between the waveguide layer 3 and the rib portion 4 and the outside air, and it is possible to suppress scattering by the boundary area and reduce the propagation loss in the optical waveguide of the optical waveguide element 41.

Using the optical waveguide element 41 in the second embodiment of the present invention, it is possible to make an optical modulator similar to the optical modulator 10A (see FIG. 6) and the optical modulator 10B (see FIG. 7) in the first embodiment of the present invention. However, in the second embodiment of the present invention, the groove portion 5 is formed so that the dimension in the height direction varies continuously.

In the optical modulator according to the second embodiment of the present invention, in section S1 of the optical waveguide included in the optical modulator 10A shown in FIG. 6, the groove portion 5 is formed such that the dimension in the height direction is continuously decreased with respect to the direction of propagation of the light wave, and in section S2, the groove portion 5 is formed such that the dimension in the height direction is continuously increased with respect to the direction of propagation of the light wave.

In the optical modulator according to the second embodiment of the present invention, in section S5 of the optical waveguide included in the optical modulator 10B shown in FIG. 7, the groove portion 5 is formed such that the dimension in the height direction is continuously decreased with respect to the direction of propagation of the light wave, and in section S6, the groove portion 5 is formed such that the dimension in the height direction is continuously increased with respect to the direction of propagation of the light wave.

The optical waveguide element 41 in the second embodiment of the present invention can be manufactured in the same process as the manufacturing process described in the first embodiment of the invention (see FIG. 8A to FIG. 8C and FIG. 9A to FIG. 9D). However, in the second embodiment of the present invention, the dimension in the height direction of the groove portion 5 is set accordingly to match the intended beam shape in the optical waveguide.

Although the first and second embodiments of the present invention are described separately herein, the first and the second embodiment may be combined. For example, the groove portion 5 may be formed such that both the dimensions in the height and width direction vary continuously along the direction of extension of the rib portion 4.

The present invention is not limited to the above-described embodiments and variants, but encompasses various variants, design changes, and the like within the technical scope of the present invention without departing from the technical concept.

INDUSTRIAL APPLICABILITY

The present invention provides an optical waveguide element capable of reducing coupling loss at a coupling portion with an optical fiber and thus reducing propagation loss in an optical waveguide, and is applicable to the fields of optical communications and optical measurement.

EXPLANATION OF REFERENCE NUMERALS 1, 41 Optical Waveguide Element
2 Supporting Substrate
3 Waveguide Layer
4 Rib Portion
5 Groove Portion
10A, 10B Optical Modulator
11 Input Waveguide
12 Bifurcation Portion
13 First-branch Waveguide
14 First Bending Portion
15 Parallel Waveguide
16 Second Bending Portion
17 Second-branch Waveguide
18 Synthesis Unit
19 Output Waveguide
20 Input Side Optical Fiber
30 Output Side Optical Fiber

The invention claimed is:

1. An optical waveguide element comprising:
a supporting substrate; and
a waveguide layer consisting of a material having an electro-optic effect stacked on the supporting substrate, wherein:
a rib portion for forming an optical waveguide is provided protruding on an upper surface of the waveguide layer;
a groove portion is formed on an upper surface of the supporting substrate directly below a part of the rib portion;
the groove portion is filled with a material having an effective refractive index comparable to that of the material constituting the waveguide layer; and
a dimension in the width direction of the rib portion is greater than half and less than twice of a dimension in the height direction from a top surface of the rib portion to a bottom surface of the groove portion, in a region where a dimension in the height direction of the groove portion is greater than zero.

2. The optical waveguide element according to claim 1, wherein:
a cross-sectional area of the groove portion varies continuously along a direction of extension of the rib portion.

3. The optical waveguide element according to claim 2, wherein:
the cross-sectional area of the groove portion varies so that the cross-sectional area of the groove portion continuously decreases with respect to the direction of propagation of a light wave propagating through the optical waveguide.

4. The optical waveguide element according to claim 2, wherein:
the cross-sectional area of the groove portion varies so that the cross-sectional area of the groove portion continuously increases with respect to the direction of propagation of a light wave propagating through the optical waveguide.

5. The optical waveguide element according to claim 3, wherein:
a dimension in the width direction of the groove portion varies continuously with respect to the direction of propagation of the light wave propagating through the optical waveguide.

6. The optical waveguide element according to claim 3, wherein:
a dimension in the height direction of the groove portion varies continuously with respect to the direction of propagation of the light wave propagating through the optical waveguide.

7. The optical waveguide element according to claim 1, wherein:
at a coupling portion with an input side optical fiber that introduces the light wave into the optical waveguide, and at a coupling portion with an output side optical fiber that outputs the light wave from the optical waveguide, a dimension in the width direction of the groove portion is almost the same as a dimension in the width direction of the rib portion; and a dimension in the height direction from a top surface of the rib portion to a bottom surface of the groove portion is almost the same as a dimension in the width direction of the rib portion.

8. The optical waveguide element according to claim 7, having a modulation unit for modulating the light wave propagating through the optical waveguide, wherein:
a cross-sectional area of the groove portion varies continuously so that the cross-sectional area of the groove portion is continuously reduced in a portion of the optical waveguide from the coupling portion with the input side optical fiber to the modulation unit; and
the cross-sectional area of the groove portion varies continuously so that the cross-sectional area of the groove portion is increased in the optical waveguide from the modulation unit to the coupling portion with the output side optical fiber.

9. The optical waveguide element according to claim 1, wherein:
a dimension in the height direction of the rib portion is greater than half and less than twice of a dimension in the height direction of the groove portion.

10. The optical waveguide element according to claim 1, wherein:
the material constituting the waveguide layer is lithium niobate; and
the material occupying the groove portion is either lithium niobate, silicon nitride having an effective refractive index about the same as that of lithium niobate, or a resin adjusted to an effective refractive index about the same as that of lithium niobate.

11. The optical waveguide element according to claim 1, wherein:
the waveguide layer is bonded to the supporting substrate.

12. The optical waveguide element according to claim 4, wherein:
a dimension in the width direction of the groove portion varies continuously with respect to the direction of propagation of the light wave propagating through the optical waveguide.

13. The optical waveguide element according to claim 4, wherein:

a dimension in the height direction of the groove portion varies continuously with respect to the direction of propagation of the light wave propagating through the optical waveguide.

* * * * *